United States Patent Office 3,631,176
Patented Dec. 28, 1971

3,631,176
CARBAMOYL SUBSTITUTED 2-AMINO-BENZIMIDAZOLES
Hein L. Klopping, Wilmington, Del., assignor to E. I. du Pont de Nemours and Company, Wilmington, Del.
No Drawing. Application Mar. 20, 1968, Ser. No. 714,462, now Patent No. 3,541,213, which is a continuation-in-part of application Ser. No. 629,900, Apr. 11, 1967, which in turn is a continuation-in-part of application Ser. No. 548,034, May 6, 1966. Divided and this application July 20, 1970, Ser. No. 56,716
Int. Cl. C07d 49/38
U.S. Cl. 260—309.2        5 Claims

ABSTRACT OF THE DISCLOSURE

Carbamoyl substituted 2-aminobenzimidazoles of the formula below are useful as mite ovicides and fungicides.

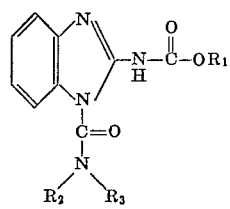

where $R_1$, $R_2$ and $R_3$ are as defined hereinafter. Exemplary species of the general class are the compounds:

methyl 1-(butylcarbamoyl)-2-benzimidazolecarbamate,
methyl 1-(p-methoxyphenylcarbamoyl)-2-benzimidazolecarbamate,
methyl 1-(ethoxycarbonylmethylcarbamoyl)-2-benzimidazolecarbamate, and the like.

CROSS REFERENCE TO RELATED APPLICATIONS

This application is a divisional of my copending application Ser. No. 714,462, filed Mar. 20, 1968, now U.S. Pat. 3,541,213, which application was a continuation-in-part of my then copending application Ser. No. 629,900 filed Apr. 11, 1967, now abandoned, which application was a continuation-in-part of my then copending application Ser. No. 548,034, filed May 6, 1966, now abandoned.

BACKGROUND OF THE INVENTION

This invention relates to carbamoyl substituted 2-aminobenzimidazoles.

The survival of man has for a long time been dependent in a large measure upon his ability to protect from the various agents of destruction, plants and their products which satisfy his basic needs. With the rapidly increasing population of the world it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

I have discovered that application of the compounds of this invention by the methods of this invention, surprisingly, entirely precludes or reduces damage to plants and inanimate organic materials due to both fungi and mites. Fungus mycelia are killed or prevented from developing further by the presence of one or more of the compounds, i.e., the compounds are fungicidal or fungistatic. The compounds further prevent mite populations from expanding or reduce them to a low level or even eliminate them by preventing the normal hatching of their eggs, i.e., the compounds are mite ovicides.

The compounds and methods of this invention also make possible the control of damage by both fungi and mites with an amazingly small amount of chemical and with surprisingly little effort. These advantages are due in large measure to the fact that the compounds when properly applied, can enter and move about in plants. This means that an entire plant can be protected from mites and fungi with a simple application of the chemical to only a part of it, i.e., the compounds are systemic. Further, if the compounds are applied after a disease causing fungus is already established within a plant, they can enter the tissues and eradicate the infection, i.e., the compounds are curative. Thus, the need for applications prior to the actual incidence of the disease is eliminated under many circumstances.

SUMMARY OF THE INVENTION

It has been found that the above outstanding fungicidal and mite ovicidal activity can be obtained by applying to the locus of mite or fungus infestation, the compounds represented by the following formulas:

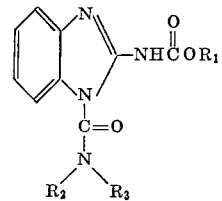

wherein $R_1$ is methyl, ethyl, isopropyl or sec-butyl;
$R_2$ is hydrogen, alkyl of 1 through 6 carbon atoms, alkenyl of 3 through 6 carbon atoms or alknyl of 3 through 6 carbon atoms; and
$R_3$ is alkyl of 1 through 12 carbon atoms; phenyl; phenyl substituted with methyl, ethyl, methoxy, ethoxy, nitro, cyano or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; cyclohexyl substituted with methyl; alkenyl of 3 through 10 carbon atoms; (alkoxycarbonyl)alkyl of 3 through 6 carbon atoms; or alkynyl of 3 through 6 carbon atoms.

Preferred within Formula I on the basis of their pesticidal activity are the compounds of the following formula:

FORMULA I-A

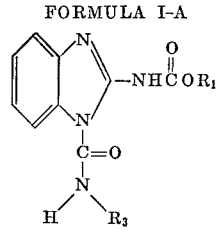

wherein $R_1$ is methyl, ethyl, isopropyl or sec-butyl; and
$R_3$ is alkyl of 1 through 12 carbon atoms; phenyl; phenyl substituted with methyl, ethyl, methoxy, ethoxy, nitro, cyano or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; cyclohexyl substituted with methyl; alkenyl of 3 through 10 carbons; (alkoxycarbonyl)alkyl of 3 through 6 carbons; or alkynyl of 3 through 6 carbon atoms.

Preferred within Formula I on the basis of economics and ease of manufacture are the compounds of the following formula:

FORMULA I-B

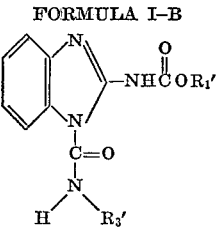

wherein $R_1'$ is methyl or ethyl and
$R_3'$ is alkyl of 1 through 8 carbon atoms.

Most preferred within Formula I in view of highest activity is the following compound:

methyl 1-butylcarbamoyl-2-benzimidazolecarbamate.

Highly active compounds within Formula I are:

methyl 1-hexylcarbamoyl-2-benzimidazolecarbamate;
methyl 1-octylcarbamoyl-2-benzimidazolecarbamate;
methyl 1-(p-methoxyphenylcarbamoyl)-2-benzimidazolecarbamate.

It will be understood that the compounds of this invention may exist in two tautomeric forms.

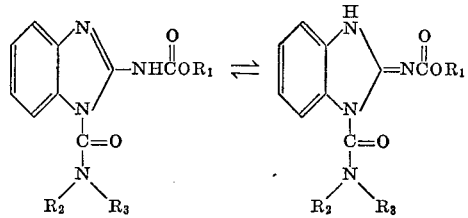

DETAILED DESCRIPTION OF THE INVENTION

The compounds of Formula I can be prepared by reacting 2-benzimidazolecarbamates with isocyanates in accordance with the following reaction:

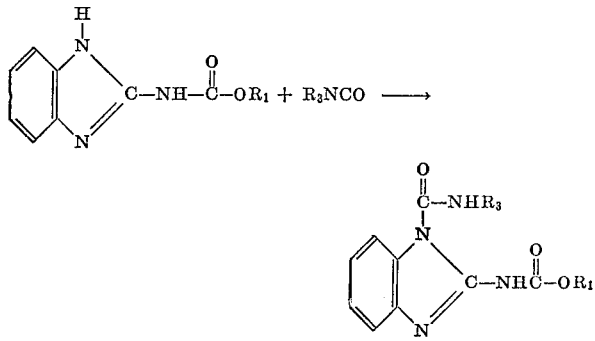

In this scheme, $R_1$ and $R_3$ are as described in Formula I.

The reaction as set forth above can be carried out in different inert solvents such as chloroform, carbon tetrachloride, methylene chloride, benzene, or cyclohexane. Mixtures of these solvents can also be used. The reaction can also be carried out without solvent by combining the two reactants in a closed system and subjecting them to shear or impact force, e.g., by use of a mix muller.

The reaction temperature, in general, is not critical and can be anywhere in between the freezing point and the boiling point of the reaction mixture, provided this boiling point is below the temperature at which reactants and products decompose. Ambient temperature is preferred.

An alternate method for preparing the compounds of Formula I involves reacting 2-benzimidazolecarbamates with a base such as sodium hydride to form the sodium derivative and then reacting that sodium derivative with a carbamyl chloride to form the desired product. This method is illustrated by the following equations:

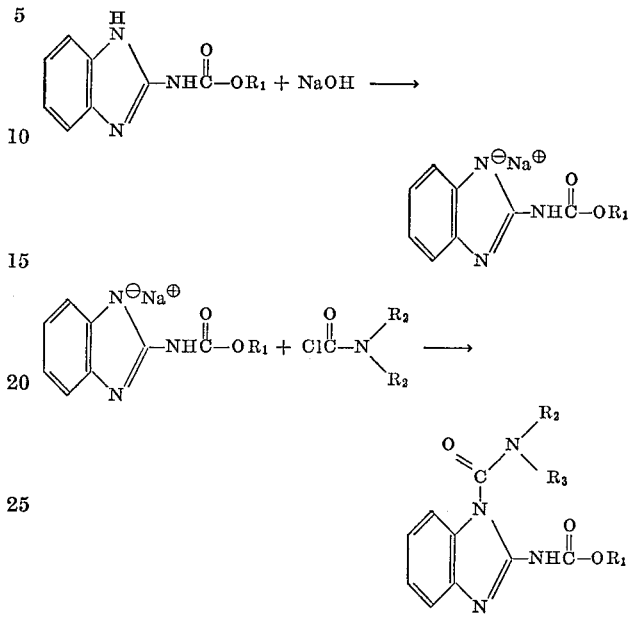

The following examples illustrate the preparation of the compounds of Formula I. The amounts are given in terms of parts by weight unless otherwise specified.

Example 1.—Preparation of methyl 1-(butylcarbamoyl)-2-benzimidazolecarbamate

To a slurry of 19.1 parts of methyl 2-benzimidazolecarbamate and 600 parts of chloroform are added 9.9 parts of n-butylisocyanate. The reaction is stirred at room temperature until a clear solution is present or until only a small amount of solid is present.

Any solids present are removed by filtration. The solvent is removed from the filtrate under reduced pressure and essentially pure methyl 1-(butylcarbamoyl)-2-benzimidazolecarbamate is obtained by triturating the remaining white solid with hexane and collecting the product by filtration.

The following compounds are prepared in accordance with the procedure set forth above by replacing n-butylisocyanate with the indicated isocyanate. The table shows not only the relative proportions of the indicated isocyanates needed for 19.1 parts by weight of methyl-2-benzimidazole-carbamate but also the product obtained.

| | Isocyanate | |
|---|---|---|
| Parts by weight | Name | Product |
| 8.5 | Propyl isocyanate | Methyl 1-(propylcarbamoyl)-2-benzimidazolecarbamate. |
| 8.5 | Isopropyl isocyanate | Methyl 1-(isopropylcarbamoyl)-2-benzimidazolecarbamate. |
| 7.1 | Ethyl isocyanate | Methyl 1-(ethylcarbamoyl)-2-benzimidazolecarbamate. |
| 8.2 | Allyl isocyanate | Methyl 1-(allylcarbamoyl)-2-benzimidazolecarbamate. |
| 5.7 | Methyl isocyanate | Methyl 1-(methylcarbamoyl)-2-benzimidazolecarbamate. |
| 12.7 | Hexyl isocyanate | Methyl 1-(hexylcarbamoyl)-2-benzimidazolecarbamate. |
| 12.5 | Cyclohexyl isocyanate | Methyl 1-(cyclohexylcarbamoyl)-2-benzimidazolecarbamate. |
| 13.9 | 2-methylcyclohexyl isocyanate | Methyl 1-[(2-methylcyclohexyl)-carbamoyl]-2-benzimidazolecarbamate. |
| 13.9 | Cyclohexylmethyl isocyanate | Methyl 1-[(cyclohexylmethyl)-carbamoyl]-2-benzimidazolecarbamate. |
| 15.5 | Octyl isocyanate | Methyl 1-[(octyl)carbamoyl]-2-benzimidazolecarbamate. |
| 13.3 | Benzyl isocyanate | Methyl 1-(benzylcarbamoyl)-2-benzimidazolecarbamate. |
| 14.7 | p-Methylbenzyl isocyanate | Methyl 1-[(p-methylbenzyl)-carbamoyl]-2-benzimidazolecarbamate. |

| Isocyanate | | |
|---|---|---|
| Parts by weight | Name | Product |
| 111.9 | Phenyl isocyanate | Methyl 1-(phenylcarbamoy-2-)benzimidazolecarbamate. |
| 13.3 | o-Tolyl isocyanate | Methyl 1-[(o-tolyl)carbamoyl]-2-benzimidazolecarbamate. |
| 13.3 | m-Toluoyl isocyanate | Methyl 1-[(m-toluoyl)carbamoyl]-2-benzimidazolecarbamate. |
| 13.3 | p-Tolyl isocyanate | Methyl 1-[(p-tolyl)carbamoyl]-2-benzimidazolecarbamate. |
| 15.4 | o-Chlorophenyl isocyanate. | Methyl 1-(o-chlorophenyl)carbamoyl]-2-benzimidazolecarbamate. |
| 15.4 | p-Chlorophenyl isocyanate. | Methyl 1-[(p-chlorophenylcarbamoyl]-2-benzimidazolecarbamate. |
| 16.1 | p-Isopropylphenyl isocyanate. | Methyl 1-[(p-isopropylphenyl)carbamoyl]-2-benzimidazolecarbamate. |
| 14.9 | p-Methoxyphenyl isocyanate. | Methyl 1-[(p-methoxyphenyl)carbamoyl]-2-benzimidazolecarbamate. |
| 14.9 | o-Methoxyphenyl isocyanate. | Methyl 1-[(o-methoxyphenyl)carbamoyl]-2-benzimidazolecarbamate. |
| 19.8 | p-Bromophenyl isocyanate. | Methyl 1-[(p-bromophenyl)carbamoyl]-2-benzimidazolecarbamate. |
| 13.7 | o-Fluorophenyl isocyanate. | Methyl 1-[(o-fluorophenyl)carbamoyl]-2-benzimidazolecarbamate. |
| 14.4 | p-Cyanophenyl isocyanate. | Methyl 1-[(p-cyanophenyl)carbamoyl]-2-benzimidazolecarbamate. |
| 17.7 | p-(Methoxycarbonyl)phenyl isocyanate. | Methyl 1-[(p-methoxycarbonylphenyl)carbamoyl]-2-benzimidazolecarbamate. |
| 19.1 | p-(Ethoxycarbonyl)phenyl isocyanate. | Methyl 1-[(p-ethoxycarbonylphenyl)carbamoyl]-2-benzimidazolecarbamate. |
| 16.4 | p-Nitrophenyl isocyanate. | Methyl 1-[(p-nitrophenyl)carbamoyl -2-benzimidazolecarbamate. |
| 16.4 | m-Nitrophenyl isocyanate. | Methyl 1-[(m-nitrophenyl)carbamoyl]-2-benzimidazolecarbamate. |
| 18.8 | 3,4,-dichlorophenyl isocyanate. | Methyl 1-[(3,4-dichlorophenyl)carbamoyl]-2-benzimidazolecarbamate. |
| 16.8 | 3-chloro-4-methylphenyl isocyanate. | Methyl 1-[(3-chloro-4-methylphenyl)carbamoyl]-2-benzimidazolecarbamate. |
| 12.9 | Ethoxycarbonylmethyl isocyanate. | Methyl 1-[2-(ethoxycarbonylmethylcarbamoyl)-2-benzimidazolecarbamate. |
| 14.3 | 2-(ethoxycarbonyl)ethyl isocyanate. | Methyl 1-[2-(ethoxycarbonyl)ethylcarbamoyl]-2-benzimidazolecarbamate. |
| 9.9 | Isobutyl isocyanate | Methyl 1-(isobutylcarbamoyl)-2-benzimidazolecarbamate. |
| 21.1 | Dodecyl isocyanate | Methyl 1-(dodecylcarbamoyl)-2-benzimidazolecarbamate. |
| 19.4 | 9-decenyl isocyanate | Methyl 1-(9-decenylcarbamoyl)-2-benzimidazolecarbamate. |

Example 2.—Preparation of methyl 1-(dimethylcarbamoyl)-2-benzimidazole-carbamate To a suspension of 19.1 parts of methyl 2-benzimidazolecarbamate in 200 parts of dimethylformamide is added 4.5 parts of sodium hydride. The resulting slurry is stirred at 50° C. until hydrogen evolution ceases. To the slurry is then added 13.0 parts of dimethylcarbamoyl chloride after which it is stirred at 50° C. for two hours and then allowed to stand over a weekend. Filtration is carried out to remove unreacted methyl 2-benzimidazolecarbamate. Removal of the solvent under reduced pressure leaves 9 parts of solid methyl 1-(dimethylcarbamoyl)-2-benzimidazolecarbamate melting with decomposition at 167–170° C.

The following compounds can be prepared by the procedure of Example 2 by using the appropriate carbamyl chloride in place of the dimethylcarbamyl chloride of that example and use of the appropriate alkyl 2-benzimidazolecarbamate.

Product:

methyl 1-(N,N-dipropylcarbamoyl)-2-benzimidazolecarbamate
methyl 1-(N,N-diethylcarbamoyl)-2-benzimidazolecarbamate
methyl 1-(N,N-dibutylcarbamoyl)-2-benzimidazolecarbamate
methyl 1-(N,N-dihexylcarbamoyl)-2-benzimidazolecarbamate
methyl 1-(N-methyl-N-octylcarbamoyl)-2-benzimidazolecarbamate
methyl 1-(N-dodecyl-N-methylcarbamoyl)-2-benzimidazolecarbamate
methyl 1-(N-ethyl-N-methylcarbamoyl)-2-benzimidazolecarbamate
methyl 1-(N-hexyl-N-methylcarbamoyl)-2-benzimidazolecarbamate
methyl 1-(N-butyl-N-ethylcarbamoyl)-2-benzimidazolecarbamate
ethyl 1-(N,N-dimethylcarbamoyl)-2-benzimidazolecarbamate
ethyl 1-(N-butyl-N-methylcarbamoyl)-2-benzimidazolecarbamate
isopropyl 1-(N-butyl-N-methylcarbamoyl)-2-benzimidazolecarbamate
isopropyl 1-(N-hexyl-N-methylcarbamoyl)-2-benzimidazolecarbamate
isopropyl 1-[N-methyl-N-(p-tolyl)carbamoyl]-2-benzimidazolecarbamate
ethyl 1-[N-ethyl-N-(p-tolyl)carbamoyl]-2-benzimidazolecarbamate
isopropyl 1-(N-cyclohexyl-N-methylcarbamoyl)-2-benzimidazolecarbamate
methyl 1-(N,N-diallylcarbamoyl)-2-benzimidazolecarbamate
methyl 1-(N-allyl-N-methylcarbamoyl)-2-benzimidazolecarbamate
methyl 1-(N-propargyl-N-methylcarbamoyl)-2-benzimidazolecarbamate Example 3

The following compounds are prepared in accordance with Example 1 by replacing the 19.1 parts of methyl 2-benzimidazolecarbamate and 9.9 parts of n-butyl isocyanate with the equivalent parts of the properly substituted benzimidazole and isocyanate necessary to prepare each named product.

Product:

ethyl 1-(allylcarbamoyl)-2-benzimidazolecarbamate
ethyl 1-(isopropylcarbamoyl)-2-benzimidazolecarbamate
ethyl 1-(sec-butylcarbamoyl)-2-benzimidazolecarbamate
ethyl 1-(hexylcarbamoyl)-2-benzimidazolecarbamate
ethyl 1-(octylcarbamoyl)-2-benzimidazolecarbamate
ethyl 1-(dodecylcarbamoyl)-2-benzimidazolecarbamate
ethyl 1-(cyclohexylcarbamoyl)-2-benzimidazolecarbamate
ethyl-[(2-methylcyclohexyl)carbamoyl]-2-benzimidazolecarbamate
ethyl 1-[(4-methylcyclohexyl)carbamoyl]-2-benzimidazolecarbamate
ethyl 1-[(p-toluoyl)carbamoyl]-2-benzimidazolecarbamate
ethyl 1-[(o-chlorophenyl)carbamoyl]-2-benzimidazolecarbamate
ethyl 1-(benzylcarbamoyl)-2-benzimidazolecarbamate
ethyl 1-[(p-methylbenzyl)carbamoyl]-2-benzimidazolecarbamate
ethyl 1-[(3,4-xylyl)carbamoyl]-2-benzimidazolecarbamate
ethyl 1-[(p-methoxyphenyl)carbamoyl]-2-benzimidazolecarbamate
ethyl 1-[(ethoxycarbonylmethyl)carbamoyl]-2-benzimidazolecarbamate
ethyl 1-[(3,4-dichlorophenyl)carbamoyl]-2-benzimidazolecarbamate
ethyl 1-[(2-ethoxycarbonylethyl)carbamoyl]-2-benzimidazolecarbamate
ethyl 1-(isobutylcarbamoyl)-2-benzimidazolecarbamate
ethyl 1-[(p-nitrophenyl)carbamoyl]-2-benzimidazolecarbamate
isopropyl 1-(methylcarbamoyl)-2-benzimidazolecarbamate isopropyl 1-(ethylcarbamoyl)-2-benzimidazolecarbamate
isopropyl 1-(propylcarbamoyl)-2-benzimidazolecarbamate
isopropyl 1-(butylcarbamoyl)-2-benzimidazolecarbamate
isopropyl 1-(allylcarbamoyl)-2-benzimidazolecarbamate
isopropyl 1-(hexylcarbamoyl)-2-benzimidazolecarbamate
isopropyl 1-(p-nitrophenylcarbamoyl)-2-benzimidazolecarbamate
isopropyl 1-(cyclohexylcarbamoyl)-2-benzimidazolecarbamate
isopropyl 1-[(3-methylcyclohexyl)carbamoyl]-2-benzimidazolecarbamate
isopropyl 1-[(butoxycarbonylmethyl)carbamoyl]-2-benzimidazolecarbamate
isopropyl 1-[(p-methylbenzyl)carbamoyl]-2-benzimidazolecarbamate
isopropyl 1-[(o-tolyl)carbamoyl]-2-benzimidazolecarbamate
isopropyl 1-[(p-tolyl)carbamoyl]-2-benzimidazolecarbamate
isopropyl 1-[(p-chlorophenyl)carbamoyl]-2-benzimidazolecarbamate
isopropyl 1-[(p-methoxyphenyl)carbamoyl]-2-benzimidazolecarbamate
isopropyl 1-[(p-cyanophenyl)carbamoyl]-2-benzimidazolecarbamate
isopropyl 1-[(ethoxycarbonylmethyl)carbamoyl]-2-benzimidazolecarbamate
sec-butyl 1-(methylcarbamoyl)-2-benzimidazolecarbamate
sec-butyl 1-(propylcarbamoyl)-2-benzimidazolecarbamate
sec-butyl 1-(butylcarbamoyl)-2-benzimidazolecarbamate
sec-butyl 1-(pentylcarbamoyl)-2-benzimidazolecarbamate
sec-butyl 1-(allylcarbamoyl)-2-benzimidazolecarbamate
sec-butyl 1-(cyclohexylcarbamoyl)-2-benzimidazolecarbamate
sec-butyl 1-[(4-methylcyclohexyl)carbamoyl]-2-benzimidazolecarbamate
sec-butyl 1-[(p-tolyl)carbamoyl]-2-benzimidazolecarbamate
sec-butyl 1-[(o-fluorophenyl)carbamoyl]-2-benzimidazolecarbamate
methyl 1-(sec-butylcarbamoyl)-2-benzimidazolecarbamate
methyl 1-(isobutylcarbamoyl)-2-benzimidazolecarbamate
methyl 1-(o-nitrophenylcarbamoyl)-2-benzimidazolecarbamate
methyl 1-(p-ethoxyphenylcarbamoyl)-2-benzimidazolecarbamate
methyl 1-(p-chlorobenzylcarbamoyl)-2-benzimidazolecarbamate
isopropyl 1-(p-nitrobenzylcarbamoyl)-2-benzimidazolecarbamate
methyl 1-(p-methylbenzylcarbamoyl)-2-benzimidazolecarbamate
methyl 1-(o-nitrobenzylcarbamoyl)-2-benzimidazolecarbamate
methyl 1-(p-methoxybenzylcarbamoyl)-2-benzimidazolecarbamate
methyl 1-(3,4-dimethylbenzylcarbamoyl)-2-benzimidazolecarbamate
methyl 1-(8-decenylcarbamoyl)-2-benzimidazolecarbamate
methyl 1-(propargylcarbamoyl)-2-benzimidazolecarbamate
methyl 1-(3-hexenylcarbamoyl)-2-benzimidazolecarbamate
methyl 1-(cyclopropylmethylcarbamoyl)-2-benzimidazolecarbamate
methyl 1-(cyclopentylmethylcarbamoyl)-2-benzimidazolecarbamate
methyl 1-(cyclohexylmethylcarbamoyl)-2-benzimidazolecarbamate
1-(p-methoxybenzylcarbamoyl)-2-benzimidazolecarbamate
1-(o-fluorobenzylcarbamoyl)-2-benzimidazolecarbamate
1-(p-bromobenzylcarbamoyl)-2-benzimidazolecarbamate
1-(o-nitrobenzylcarbamoyl)-2-benzimidazolecarbamate
methyl 1-(4-methylcyclohexylcarbamoyl)-2-benzimidazolecarbamate As mentioned previously, it has been found that the compounds of this invention possess outstanding fungicidal and mite ovicidal activity when employed to prevent or mitigate damage to plants and inanimate organic materials. A further aspect of this invention involves methods which when used in conjunction with the compounds of this invention, result in advances in mite and fungus control of great practical importance. A further advantage of the compounds of the invention is that they have a low order of mammalian toxicity. The paragraphs which follow describe in more detail the utility of this invention.

The compounds of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth. Painted surfaces are protected from stain and discoloration by incorporation of a compound of this invention in the paint formulation.

The many fungi against which the compounds of this invention are active may be represented by, but is not intended to be limited to, the following: *Venturia inaequalis,* which causes apple scab; *Podosphaera leucotricha,* which causes powdery mildew on apple; *Uromyces phaseoli,* which causes bean rust; *Cercospora apii,* which causes early blight of celery; *Cercospora beticola,* which causes leaf spot of sugar beets; *Sclerotinia sclerotiorum,* which causes rot of vegetable crops, such as lettuce, beans, carrots, and celery; Colletotrichum spp., which cause anthracnose of fruits and vegetables, such as beans, tomatoes and coffee; *Septoria apii,* which causes late blight of celery; *Cercospora musae,* which causes Sigotoka disease of banana; piricularia sp., which causes Johnson spot on banana; *Erysiphe cichoracearum,* which causes powdery mildew on cantaloupe and other cucurbit crops; *Penicillium digitatum,* Phomopsis spp., and *Diplodia natalensis,* which cause fruit rots on citrus; *Ceratostomella ulmi,* which causes Dutch elm disease; *Sphaerotheca humuli,* which causes powdery mildew on roses; *Diplocarpon rosae,* which causes black spot on roses; Ramularia sp., which causes leaf spots on ornamental plants; *Botrytis cinerea,* which causes blossom and fruit rots of ornamentals, fruits and vegetables; *Uncinula necator,* which causes powdery mildew on grapes; *Guignardia bidwellii* which causes grape black rot; *Melonconium fuligineum,* which causes white rot of grapes; *Coccomyces hiemalis,* which causes cherry leaf spot; Sytospora sp., which cause cankers of trees; *Cladosporium carpophilum,* which causes peach scab; *Fusicladium effusum,* which causes pecan scab; *Erysiphe graminis,* which causes powdery mildew on cereals; *Monolinia (Sclerotinia) laxa* and *M. fructicola,* which cause brown rot of stone fruits, such as peaches, cherries and apricots; *Pseudopeziza ribes,* which causes leaf spot on gooseberry; *Piricularia oryzae,* which causes rice blast; *Puccinia recondita, P. coronata* and *P. glumarum,* which cause leaf rusts of wheat, oats and grasses, respectively; *Puccinia graminis tritici,* which causes stem rust of wheat; *Claviceps purpurea,* which causes ergot of rye and grasses; *Aspergillus niger,* which causes cotton boll rot as well as decay following wounding in many plant tissues; *Aspergillus flavus,* which causes mold growth on peanuts, as well as on other food and feed materials; *Aspergillus terreus,* which is common in soil and attacks vegetable matter; *Tilletia caries* and other Tilletia species, which cause common bunt of wheat; *Ustilago tritici, Ustilago nigra, Ustilago avena* (and other Ustilago species), which cause loose smut of wheat, barley, and oats, respectively; *Urocystis tritici* and other Urocystis species, which cause loose smut of wheat; *Sphacelotheca sorghi,* which causes covered smut of sorghum; *Ustilago hordei* and *Ustilago kolleri,* which cause covered smut of barley and oats, respectively; *Pithomyces chartorum,* which is present in turf, pastures, and other grassy areas and is known to have several secondary effects; *Gloeodes pomigena,* which causes sooty blotch on apples; *Physalospora obtusa,* which causes black rot on apples; *Microthyriella rubi,* which causes flyspeck on apples; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite ovicidal action of the compounds of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs are treated with one of these compounds, or if they are laid on a surface containing one of these compounds. Further, the eggs will not hatch if they are laid by a female mite that has been in contact with one of these compounds, or are laid by a female mite that is ingesting or has recently ingested food such as plant juices containing one of these compounds. This interference with the hatching of eggs prevents the population from increasing significantly beyond that present at the time of treatment. Also, this ovicidal action, along with the high natural mortality of adults, can largely eliminate mites from an already infested area over a relatively short period of time. Further, as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific susceptible mites along with the types of damage that they can cause: *Panonychus ulmi* (European red mite) and *Tetranychus telarius* (two-spotted mite) which are commonly called "orchard mites"; these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Phyllocoptruta aleivora* which causes citrus rust; *Bryobia praetiosa* (clover mite) which attacks clover, alfalfa and other crops; *Phyllocoptruta oleivora,* the citrus rust mite; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cichoracearum*) and spider mites such as *Tetranychus urticae* on the resulting plants for periods in excess of 40 days. Application to soil also provides control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus successful application to seed as described, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant, i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horiticultural crops (including ornamentals, small fruits and berries), fiber crops, grain and seed crops, sugarcane, sugar beets, pineapple, forage and hay crops, beans, peas, soybeans, peanut, potatoes, sweet potatoes, tobacco, hops, turf and pasture.

Living plants may be protected from fungi and mites by aplying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms.

Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amounts within this range depends upon a number of variable which are well known to those skilled in the art of plant protection. These variable include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,00 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,00 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foliage roots and the like, harvested for food or feed, are protected from decay and other deterioration caused by fungi or mites during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the compounds of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 5000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

Damage by mites to stored organic products such as grain, seed, bulbs, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.05 to 1000 grams of the active compound of this invention per 93 square meters of surface to be kept free of excessive mite populations.

As was previously set forth, the compounds of this invention are especially suited for use on living plants. Application to the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually killed. This approach or effect is termed "curative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necessary to keep the plants moist by some special effort for best results.

When the compounds of this invention are applied, their activity can be enhanced by using certain adjuvants, for example in the water in which the benzimidazole fungicides are dispersed. These adjuvants may be surface active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide/polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkylbenzene sulfonates, imidazolines, taurates, ethoxylated mercaptans, ethoxylated amines and amides, modified phthalic glycerol alkyd resins, and similar materials. The oils include nonphytotoxic aliphatic spray oils and triglycerides, ether with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface active agents to improve the fungicidal and mite ovicidal activity of these compounds are products such as dioctyl sodium sulfosuccinates ("Aerosol" OT and "Aerosol" OT–B), blends of aromatic sulfonates and ethylene oxide derivatives ("Agrimul" GM, "Agrimul" A–100, "Agrimul" N–100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon" AP78), sodium N-methyl-N-oleoyl taurate ("Igepon" T77), sodium salt of sulfated lauryl and myristyl colamide ("Intramine" Y), polyethylene glycol 400 oleic acid esters ("Nonisol" 210), sodium dodecylbenzene sulfonates ("Sul-Fon-Ate" AA10, "Ultrawet" K), polyoxyethylene ethers with long-chain alcohols ("Surfonic" LR30, "Alfonic" 1012–6, "Brij" 30, "Tergitol" TMN), ethylene oxide condensates with propylene oxide/ethylene diamine condensates ("Tetronic" 504), polyhydric alcohol esters ("Trem" 014), modified phthalic glycerol alkyd resins ("Triton" B1956), quaternaries ("Zelec" DP), alkylphenol ethylene oxide condensates ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "Detergents and Emulsifiers," 1965 Annual, or 1966 Annual, published by John W. McCutcheon Inc., 236 Mt. Kemble Avenue, Morristown, N.J.

Preferred oils include spray oils such as "Orchex" 796 made emulsifiable with "Triton" X–45, castor oil made emulsifiable with "Triton" X–114, corn oil made emulsifiable with "Triton" X–114, Volck Oil #70, Sunoco Oil No. 7E and similar nonphytotoxic spray oils of vegetable, animal or mineral origin.

The preferred rates for these surfactants when used in sprays is in the range from 10 to 10,000 parts per million of the spray fluid. More preferred rates are in the range of 30 to 3,000 parts per million and the most preferred rates are in the range of 100 to 1,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

As previously mentioned, the compounds of the invention are systemic. For systemic applications to aboveground parts, such as foliage, stems and fruit, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

The fungicidal and mite ovicidal compositions of the invention contain in sufficient amount to exert fungicidal or mite ovicidal action, one or more compounds of this invention in admixture with a carrier material or conditioning agent of the kind used and commonly referred to in the art as an adjuvant or modifier. The general classes of adjuvants applicable to the compounds of this invention are inert solids, organic liquid solvents, organic liquid or aqueous diluents and surface-active agents. Formulations adapted for ready and efficient application using conventional applicator equipment are prepared by compounding the compounds of this invention with suitable adjuvants by mixing, grinding, stirring or other conventional processes. Normally the active ingredient composes 1–95% by weight of the fungicidal or mite ovicidal composition.

Solid compositions can be in the form of water-dispersible powders, dusts, pellets and granules. Water-dispersible powders are particularly useful and can be prepared by simple mixing and grinding steps and can be either used as such, diluted with inert solids to form dusts or granules, or suspended in a suitable liquid medium for spray or seed treatment application. The powders usually comprise active ingredient admixed with varying amounts of conditioning agents, surface-active agents and stabilizers. The classes of extenders suitable for the wettable powders of this invention are clays, such as the kaolins, diatomaceous earths, calcium carbonates, sulfur, sodium sulfate, and also synthetic silicas and silicates. Diluents that have been surface reacted, such as organic acid coated calcium carbonate, can also be used. Diluents of organic origin such as walnut shell flour, lignin sulfonate, corn cob flour, or carbohydrates can also be used. In addition, natural or synthetic frangible resins can be used.

Among the preferred diluents are coated calcium carbonate, corn cob flour, starch, sucrose, sulfur, sodium sulfate and partially desulfonated sodium lignin sulfonate. It is also preferred that the diluents be used in an anhydrous state.

The active ingredient usually makes up from about 25-90% of these wettable powder compositions. These wettable powders can also be converted to dusts containing 1-25% of active material by mixing or grinding with one or more of the diluents listed above, or with pyrophyllite, volcanic ash and other dense, rapid-settling inert solids. Alternatively, dusts can be prepared by grinding the dust diluents with the active ingredient, or by preparing dust concentrates for further dilution. These dust concentrates can contain from 80-95% of the active ingredient, blended and ground with diluents and, if desired, small amounts of surface active agents.

For the granule compositions of this invention, the most suitable carriers are of two types. The first are porous, absorptive, preformed granules, such as preformed and screened granular clays, heat expanded granular screened vermiculite, or granular botanicals. On any of these, a solution or aqueous or nonaqueous suspension of the active agent can be sprayed at concentrations up to 25 weight percent of the total weight. In addition to the active component, the solutions or suspensions can contain surfactant and also binders such as sucrose or swollen starch to aid in adhering small particles of dispersed product to the dried granules. Such adhesive materials may also be surfactants and include such products as polyvinyl alcohol, calcium and magnesium lignin sulfonate in admixture with wood sugars, acrylate and asphalt emulsions, abietates, etc. Oils or other non-volatile liquids like glycols can also be used to improve adhesion.

The second suitable type of carrier is the powdered kaolinitic clays, or bentonitic clays in the sodium, calcium or magnesium forms. These clays are blended with the active components and optionally surfactants to give mixtures that are granulated and dried to yield granular material with the active component distributed uniformly throughout the mass. Other suitable diluents for granulation are sulfur, organic dusts such as corn cob flour, starch, dextrin, sucrose, in conjunction with binders and surfactants. Such granules can also be made with 25 to 30 weight percent active component, but more frequently a concentration of about 10 weight percent is desired for optimum distribution. Similar compositions can be made by extruding the mixture in the presence of moisture or other liquids such as polyethylene glycols and converting the extrusions into granules or pellets by a suitable combination of cutting, drying, and crushing steps. The granular compositions of this invention are most useful in a size range of 15-60 mesh (approx. 0.25 to 1.3 mm.).

Liquid compositions employing one or more of the active compounds of this invention are prepared by admixing the active ingredient with a suitable liquid diluent medium. The active ingredient can be either in solution or in suspension in the liquid medium. Typical of the liquid media which can be used are water, paraffinic spray oils, alkylated naphthalenes, xylene, alcohols, chlorinated hydrocarbons and ketones. The active ingredient usually makes up from about 0.5 to 50% of these liquid compositions. In addition, surface-active agents, particularly emulsifiers, can be present to aid in the suspension or dispersion or to emulsify the composition into water.

Compositions of the invention, especially liquids and wettable powders, contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

Suitable surface-active agents include anionic, cationic, and non-ionic types. In general, less than 10% by weight of the surface-active agent is present in the compositions of this invention, although frequently the amount of surface-active agent in these compositions is less than 2% by weight.

Preferred wetting agents are alkylbenzene- and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium, calcium and magnesium lignin sulfonates, polymeric alkylnaphthalene sulfonates, sodium naphthalene sulfonate, polyvinylpyrrolidone derivatives, polymethylene bisnaphthalenesulfonate and sodium N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender can be replaced by a corrosion inhibitor or an antifoaming agent, or both. In some instances, it may be advantageous to use larger amounts of dispersants such as the lignin sulfonates in wettable powder, pellet, granule and dust compositions. In such a case, the lignin sulfonates additionally act as diluents for powders and as binder for granules and pellets.

Emulsifying agents most suitable for the liquid compositions of this invention are alkylaryl polyethoxy alcohols, condensation products of ethylene oxide with long-chain alkyl alcohols, mercaptans or amines, sorbitan fatty acid esters, polyethylene glycol fatty esters, fatty alkylol amide condensates, amine salts of fatty alcohol sulfates, and oil soluble salts of petroleum sulfonates. Mixtures of emulsifying agents are often preferred. Such emulsifying agents will comprise from about 3 to 10 weight percent of the total composition. As described above, however, much greater amounts of emulsifying agent can be used to give improved results.

The compounds of this invention and the oils, humectants, enzymes, carbohydrates, and acids useful to enhance the fungicidal and mite-ovicidal activity of these compounds can be brought together in several ways. For example, the additive which will enhance activity can be mixed with compounds of the invention when spray slurries are being prepared. It is often also possible and convenient to produce formulations in which the additive and the compound of the invention will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredient compound to additives may vary widely. Thus, the additive may be present in such mixtures within the range of from 33 to 10,000 parts per 100 parts of the compounds of this invention. More preferred are rates of from 40 to 5,000 parts of additive per 100 parts of active ingredient and a range of ratios from 50 to 3,500 per 100 parts of compound is even more preferred.

Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier can serve as both wetter and dispersant.

Such compositions can contain, in addition to the active ingredient of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a,4,7,7a-tetrahydroindane;
1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a),4,5,6,6,8,8-heptachloro-3a,4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate (carbaryl);
methylcarbamic acid, ester with phenyl, 4-(dimethylamino)-3,5-dimethyl;
methylcarbamic acid, ester with 1,3-dithiolan-2-one oxime;
O,O-diethyl-O-(2-isopropyl-4-methylpyrimid-6-yl) thiophosphate;
O,O-dimethyl-1-hydroxy-2,2,2-trichloroethyl phosphonate (diazinon);
O,O-dimethyl-S-(1,2-dicarbethoxyethyl)dithiophosphate (malathion);
O,O-dimethyl-O-p-nitrophenyl thiophosphate (methyl parathion);
O,O-dimethyl-O-(3-chloro-4-nitrophenyl)thiophosphate;
O,O-diethyl-O-p-nitrophenyl thiophosphate (parathion);
di-cyclopentenyl-4-hydroxy-3-methyl-2-cyclopenten-1-one chrysanthemumate;
O,O-dimethyl-O-(2,2-dichlorovinyl)phosphate (dichlorvos);
mixture containing 53.3% "Bulan", 26.7% "Prolan" and 20.0% related compounds;
O,O-dimethyl-O-(2,4,5-trichlorophenyl)phosphorothioate;
O,O-dimethyl-S-(4-oxo-1,2,3-benzotriazine-3(4H)-yl-methyl)-phosphorodithioate (azinphosmethyl);
bis(dimethylamino)phosphonous anhydride;
O,O-diethyl-O-(2-keto-4-methyl-7-a'-pyranyl) thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-(2-(ethylmercapto)-ethyl)thiophosphate (demeton);
2,4-dinitro-6-sec-butyl phenol;
toxaphene;
O-ethyl-O-p-nitrophenylbenzenethiophosphonate (EPN);
4-chlorophenyl-4-chlorobenzene sulfonate;
p-chlorophenyl-phenyl sulfone;
tetraethyl pyrophosphate (TEPP);
1,1-bis(p-chlorophenyl)ethanol;
1,1-bis(chlorophenyl)-2,2,2-trichloroethanol (dicofol);
p-chlorophenyl-p-chlorobenzyl sulfide;
bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
2-(o-hydroxyphenyl)-1,3-dithiolane methylcarbamate ester;
2-(o-hydroxyphenyl)-1,3-dioxolane methylcarbamate ester;
dl-2-allyl-4-hydroxy-3-methyl-2-cyclopenten-1-one esterified with a mixture of cis and trans dl-chrysanthemum monocarboxylic acids;
butoxypolypropylene glycol;
ethyl 2-hydroxy-2,2-bis(4-chlorophenyl)acetate (chlorobenzilate);
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamoyl)thiolacetohydroxamate (methomyl);
5-methyl 1-dimethylcarbamoyl-N-[(methylcarbamoyl)oxy]thioformimidate;
2-heptodecylimidazoline acetate (glyodin);
quinone oxyaminobenzooxohydrazone;
tetraalkyl thiuram disulfides such as tetramethyl thiuram disulfide or tetraethyl thiuram disulfide;
metal salts of ethylene bisdithiocarbamic acid, e.g. manganese, zinc, iron and sodium salts;
pentachloronitrobenzene;
2-(1-methylheptyl)-4,6-dinitrophenyl crotonate and other nitrophenol derivatives;
N-dodecylguanidine acetate (dodine);
N-(trichloromethylthio)phthalimide;
N-trichloromethylthiotetrahydrophthalimide (captan);
cis-N-[(1,1,2,2-tetrachloroethyl)thio]-4-cyclohexene-1,2-dicarboximide;
2,4-dichloro-6-(o-chloroaniline)-s-triazine;
bis(4-chlorophenyl)-3-pyridylmethanol;
3,3'-ethylenebis(tetrahydro-4,6-dimethyl-2H-1,3,5-thiodiazine-2-thione);
triphenyltin hydroxide;
1,4-dichloro-2,5-dimethoxy benzene;
triphenyltin acetate;
metal (e.g. iron, sodium and zinc), ammonium and amine salts of dialkyl dithiocarbamic acids (for example, ziram, or ferbam);
2,6-dichloro-4-nitroanaline;
tetrachloronitroanisole;
hexachlorobenzene;
hexachlorophene;
tetrachloroquinone;
2,3-dichloro-1,4-naphthoquinone;
cupric hydroxide;
tribasic copper sulfate;
fixed copper;
sulfur;
1,2-dibromo-3-chloropropene;
1,2-dibromo-3-chloropropane;
dichloropropane-dichloropropene mixture;
ethylene dibromide;
chloropicrin;
sodium monoethyl dithiocarbamate (SMDC);
tetrachloroisophthalonitrile;
Streptomycin Kasugamycin or other antibiotics;
2-(2,4,5-trichlorophenoxy)propionic acid;
p-chlorophenoxyacetic acid;
1-naphthalene acetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The pressures of an expanding world population, together with the need for more economical agricultural practices have resulted in earlier harvesting of grains, including corn. Frequently the grain is stored or sold to grain elevators without proper drying. Spoilage of the grain under these conditions may be quite rapid, with the formation of toxins and other substances that are very harmful or fatal when fed to animals.

Safe, effective feed additives that combat spoilage are thus of great importance to agriculture.

The compounds of this invention can be used to prevent the spoilage of animal feeds. In particular, when mixed with the feed, they provide more efficient and longer lasting protection without harm or injury to livestock that consume it. The compounds of this invention may be conveniently formulated for this use in a number of the ways previously disclosed and these formulations may be mixed directly with mixed feed, newly harvested hay and newly harvested grain. These compounds effectively prevent the spoilage of corn, sorghum, wheat, barley oats, rye and other grains that may be used as livestock feed.

Under normal conditions, these compounds may be incorporated into feeds at rates of from 0.01% to 0.25% with excellent results. Higher rates may be required under very damp conditions.

These compounds can also be used to improve the performance of other feed additives, such as sodium propionate, by mixing the two additives directly, or by adding them separately to the feed to be protected.

The compounds of this invention have an activity which relates to the treatment of sewage, soil or other substances in which natural oxidation processes occur. More specifically, the addition of these benzimidazole compounds to such substrates increases the rate and magnitude of oxidation processes.

Sewage is a dilute aqueous solution of organic wastes which must be treated to prevent pollution of natural water sources. During sewage treatment, complex organic and inorganic molecules are oxidized to simpler molecules, such as carbon dioxide, water and nitrates. Two common techniques for increasing the oxidation, or decomposition, rate of sewage in modern sewage treatment plants are the use of a trickling filter and the use of aeration tanks. The addition of benzimidazole compounds to sewage adds a new technique for increasing the decomposition rate of sewage, and can be used to increase the effects achieved in trickling filters and aeration tanks. When benzimidazole compounds are added to sewage, the result is an increase in the rate of oxygen utilization in the sewage which signifies an increase in the decomposition rate of the sewage.

The addition of benzimidazole compounds to soil results in a more rapid and complete oxidation of fertilizer nitrogen into nitrates. The formation of nitrates in the soil is related to soil temperature and decreases with decreasing temperature. Below 15° C. very little nitrate forms. Consequently, in cold climates where the growing season is short, the addition of benzimidazole compounds to nitrogenous fertilizers will result in a more rapid and complete conversion into nitrates and thereby stimulate plants to mature faster.

The compounds of the present invention also possess activity against helminth parasites of warm-blooded animals. Properly formulated and administered, these can be utilized for the treatment of helminthiasis of animals by oral administration.

For example, the subject compounds are useful for the control of infections such as *Trichuris vulpis* in dogs and gastroenteritis in sheep due to such parasites as Ostertagia, Haemonchus and Copperi species. In addition, nematodes in laboratory mice such as *Aspicularis teraptera* and others may also be checked. Various ancyclostomes such as *Bunestomium trigenecephalum* and *Ancyclostoma caninum* are also controlled by the compounds of this invention.

Anthelmintic activity is obtained by oral administration of the compounds of this invention mixed with a suitable non-toxic carrier to obtain the active anthelmintic composition. The carrier can be a pharmaceutically acceptable diluent or excipient normally used for the preparation of medicaments and include such materials as lactose, calcium, phosphate, gelatin, pectin and others. Liquid carrier may be taken from such agents as olive oil, sesame oil and water. Alternatively the active ingredients of this invention may be incorporated in a receptacle such as a hard or soft gelatin capsule. The quantity of the active ingredient administered to the animal is in the range of 20 to 600 mg./kg./day.

The following examples illustrate the activity of the compounds of Formula I. All parts are parts by weight unless otherwise indicated.

Example 4

| | Percent |
|---|---|
| Methyl 1-(butylcarbamoyl) - 2 - benzimidazolecarbamate | 50 |
| Dioctyl sodium sulfosuccinate (Aerosol OTB) | 3 |
| Low viscosity methylcellulose (Methocel 15) | 0.5 |
| Sucrose (commercial cane sugar) | 46.5 |

The above components are blended and hammer-milled, then air milled until the active component is substantially all below 5 microns.

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also, the untreated trees have poor twig growth and small, spotted fruit.

The trees sprayed with methyl 1-(butylcarbamoyl)-2-benzimidazole carbamate are essentially free of mites, their eggs and apple scab. As a result of the excellent mite control, the sprayed trees have foliage of a thrifty, dark green color, and they exhibit good twig growth and fruit size.

The following compounds may be similarly formulated and when used as above give like results.

sec-butyl 1-(methylcarbamoyl)-2-benzimidazolecarbamate
methyl 1-(9-decenylcarbamoyl)-2-benzimidazolecarbamate
ethyl 1-(ethoxycarbonylmethylcarbamoyl)-2-benzimidazole carbamate
ethyl 1-(allylcarbamoyl)-2-benzimidazolecarbamate
isopropyl 1-(p-cyanophenylcarbamoyl)-2-benzimidazolecarbamate
methyl 1-(p-methoxyphenylcarbamoyl)-2-benzimidazolecarbamate
methyl 1-(allylcarbamoyl)-2-benzimidazolecarbamate
methyl 1-(butylcarbamoyl)-2-benzimidazolecarbamate
methyl 1-(ethylcarbamoyl)-2-benzimidazolecarbamate
methyl 1-(3,4-dichlorophenylcarbamoyl)-2-benzimidazolecarbamate
methyl 1-(isopropylcarbamoyl)-2-benzimidazolecarbamate
methyl 1-(cyclohexylcarbamoyl)-2-benzimidazolecarbamate methyl 1-(p-nitrophenylcarbamoyl)-2-benzimidazole-
    carbamate
methyl 1-(p-cyanophenylcarbamoyl)-2-benzimid-
    azolecarbamate
ethyl 1-(hexylcarbamoyl)-2-benzimidazolecarbamate
isopropyl 1-(butoxycarbonylmethylcarbamoyl)-
    2-benzimidazolecarbamate
isopropyl 1-(cyclohexylcarbamoyl)-2-benzimid-
    azolecarbamate
isopropyl 1-(p-nitrophenylcarbamoyl)-2-benzimidazole-
    carbamate
isopropyl 1-(allylcarbamoyl)-2-benzimidazolecarbamate
isopropyl 1-(methylcarbamoyl)-2-benzimidazole-
    carbamate
isopropyl 1-(hexylcarbamoyl)-2-benzimidazolecarbamate
isopropyl 1-(butylcarbamoyl)-2-benzimidazole-
    carbamate
methyl 1-(dodecylcarbamoyl)-2-benzimidazolecarbamate
methyl 1-(octylcarbamoyl)-2-benzimidazolecarbamate
methyl 1-(2-methylcyclohexylcarbamoyl)-2-benzimid-
    azolecarbamate
methyl 1-(hexylcarbamoyl)-2-benzimidazolecarbamate
methyl 1-(propylcarbamoyl)-2-benzimidazolecarbamate
methyl 1-(m-tolylcarbamoyl)-2-benzimidazolecarbamate
methyl 1-(o-tolylcarbamoyl)-2-benzimidazolecarbamate
methyl 1-(ethoxycarbonylmethyl carbamoyl)-
    2-benzimidazolecarbamate
methyl 1-(p-tolylcarbamoyl)-2-benzimidazolecarbamate
methyl 1-(p-ethoxyphenylcarbamoyl)-2-benzimid-
    azolecarbamate
methyl 1-(cyclohexylmethylcarbamoyl)-2-benzimidazole-
    carbamate
methyl 1-(benzylcarbamoyl)-2-benzimidazolecarbamate
isopropyl 1-(ethoxycarbonylmethylcarbamoyl)-
    2-benzimidazolecarbamate
ethyl 1-(o-nitrophenylcarbamoyl)-2-benzimidazole-
    carbamate
methyl 1-methylcarbamoyl-2-benzimidazolecarbamate
methyl 1-phenylcarbamoyl-2-benzimidazolecarbamate Example 5

The following formulation is prepared by intimately blending the following ingredients and hammer-milling them until the particles are substantially all below 20 microns.

Methyl 1 - (propylcarbamoyl) - 2 - benzimidazole-
    carbamate _____ 50.0
Oleic acid ester of sodium isethionate _____ 2.0
Sodium lauryl sulfate _____ 1.0
Synthetic fine silica _____ 47.0

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also the untreated trees have poor twig growth and small, spotted fruit. The trees sprayed with methyl 1-(propylcarbamoyl)-2-benzimidazolecarbamate are essentially free of mites, their eggs and apple scab. As a result of the excellent mite control, the sprayed trees have foliage of a thrifty, dark green color, and they exhibit good twig growth and fruit size.

The following compound may be formulated as described in this example and when used as indicated gives similar results, methyl 1-(hexylcarbamoyl)-2-benzimidazolecarbamate.

Example 6

Percent
Methyl 1-butylcarbamoyl - 2 - benzimidazolecarba-
    mate _____ 51.6
Alkylnaphthalene sulfonate, sodium salt ("Alkanol"
    B) _____ 5.0
Polyvinylpyrrolidone derivative ("Ganex" V 904) __ 1.0
Calcium carbonate surface-reacted with propionic
    acid _____ 42.4

The mixture is prepared by predrying all the compounds and then blending, hammer-milling, and finally air-milling until the particle size is below about five microns.

Test plots are established in a rice field. These are sprayed with water containing a suspension of the wettable powder described above along with an aliphatic amide alkyl sulfonate surface active agent ("Hyfoam" Base LL). The amount of the wettable powder used is such as to provide 1.5 grams of the active compound of this invention per liter of water. The amount of "Hyfoam" Base LL used is 400 p.p.m. in the final spray. The spray is applied at weekly intervals at the rate of 900 liters per hectare. The remainder of the field is left unsprayed.

Three months after the start of the test, the sprayed plots are healthy and growing well. The untreated plots, on the other hand, are seriously damaged by the rice blast fungus, *Piricularia oryzae* which greatly reduces yield.

Example 7

The following formulation is prepared by intimately blending the ingredients and grinding the blend in an air attrition mill until the particle size is substantially less than 5 microns and then reblending.

Methyl 1-(butylcarbamoyl)-2-benzimidazole-carba-
    mate _____ 85.0
Alkylnaphthalene sulfonic acid, sodium salt _____ 1.5
Sodium N-methyl-N-oleoyl taurate _____ 2.0
Synthetic fine silica _____ 11.5

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage.

A sufficient time is allowed for all viable eggs to hatch. Counts demonstrate that few of the eggs hatch from among those laid by mites that had fed on foliage from pots with soil containing the compound of this formulation. Hatch to provide living young was essentially complete, on the other hand, among eggs laid by mites similarly handled except that the plants providing sustenance were not in contact with the compound of this formulation. This experiment demonstrates systemic movement in plants and mite ovicide effect.

Example 8

A dust concentrate is prepared as follows:
                                                    Percent
Methyl 1 - (butylcarbamoyl)-2-benzimidazolecarba-
    mate _____ 50
Sucrose (commercial cane sugar) _____ 50

The above ingredients are blended and milled to a particle size below 10 microns, followed by reblending.

A dilute dust is then prepared by blending 16 parts of the above mixture with 84 parts of ground phosphate rock.

A uniform cherry orchard in Michigan is selected for the test. Alternate trees are dusted every 14 days at the rate of 1 kg. per tree with the above dust formulation. The remaining trees are left unprotected.

On September 1 the trees are examined. The trees that had been dusted with the compound of this invention are green and healthy, with all leaves remaining on the trees. At this time the foliage of the unprotected trees is largely discolored due to attack by the leaf spot fungus (*Coccomyces hiemalis*) and the two spotted mite (*Tetranychus telarius*.) Further, much of the foliage of the unprotected trees has fallen due to the effect of the two pests.

The following compounds may be similarly formulated and when used as above give like results.

methyl 1-(isopropylcarbamoyl)-2-benzimidazolecarbamate
methyl 1-(isobutylcarbamoyl)-2-benzimidazolecarbamate
methyl 1-(octylcarbamoyl)-2-benzimidazolecarbamate Example 9

The following ingredients are converted into a dust as indicated:

Methyl 1-(ethylcarbamoyl) - 2 - benzimidazolecarbamate _____ 20
Pyrophyllite _____ 79
Alkylnaphthalene sulfonic acid, sodium salt _____ 1

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus spp.*, which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compounds may be similarly formulated and when used as above give like results.

methyl 1-[(p-tolyl)carbamoyl]-2-benzimidazolecarbamate
methyl 1-[(o-chlorophenyl)carbamoyl]-2-benzimidazolecarbamate
methyl 1-(isopropylcarbamoyl)-2-benzimidazolecarbamate
methyl 1-octadecylcarbamoyl-2-benzimidazolecarbamate Example 10

A dust of the following formulation is prepared:

Percent
Wettable powder of Example 4 _____ 2
Calcium carbonate surface reacted with stearic acid __ 98

The mixture is prepared by blending the two components in a ribbon blender, followed by application of mold shear in a mill.

The formulation is useful for the control of grape powdery mildew incited by *Uncinula necator*. This is demonstrated by a field test in which alternate rows of grapes growing in California are dusted lightly each week during the growing season. At harvest the grape vines in the treated rows are healthy and growing well. The vines in the untreated rows, however, are heavily diseased with powdery mildew and, as a consequence, growing slowly. The berries on the untreated vines are discolored and cracked open due to powdery mildew.

Example 11

A granular formulation is prepared as follows:

Granular corn cob (15–30 mesh) i.e. approx. 0.59–1.3 mm. _____ 90
Methyl 1 - (phenylcarbamoyl)-2-benzimidazolecarbamate _____ 10

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3600 meters of row. The remaining rows are untreated.

Six weeks after planting, many of the plants in the rows without the granules are dead, and others show soreshin lesions caused by *Rhizoconia solani* as well as heavy populations of the Pacific mite (*Tetranychus pacificus*). In the rows that had received the granules, all plants remain alive and are healthy, and further they are free of mites. The affect on mites is clearly systemic.

The following compounds may be similarly formulated and when used as above give similar results.

methyl 1-(butylcarbamoyl)-2-benzimidazolecarbamate
methyl 1-(3-chloro-4-methylphenylcarbamoyl)-2-benzimidazolecarbamate
methyl 1-[(m-tolyl)carbamoyl]-2-benzimidazolecarbamate
methyl 1-[(ethoxycarbonylmethyl)carbamoyl]-2-benzimidazolecarbamate
methyl 1-[(p-ethoxycarbonylphenyl)carbamoyl]-2-benzimidazolecarbamate Example 12

A wettable powder formulation is prepared from the following ingredients in the proportions given:

Methyl 1 - (butylcarbamoyl) - 2-benzimidazolecarbamate _____ 25
Methyl O-(methylcarbamyl)thioacetohydroxamate __ 10
Oleic acid ester of sodium isethionate _____ 2
Sodium lauryl sulfate _____ 2
Diatomaceous silica _____ 61

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O-(methylcarbamoyl)thioacetohydroxamate. The resulting suspension is then sprayed at weekly intervals on one pair of similar, adjacent plots in a greenbean field in Florida at the rate of two kilograms of methyl 1-(butylcarbamoyl)-2-benzimidazolecarbamate per hectare. The test area is selected as one in which there is a high infestation of the two-spotted mite, *Tetranychus bimaculatus*, and the Mexican bean beetle, *Epilachna varivestis*. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-methylcarbamyl)thiolacetohydroxamate alone are free from attack by the Mexican bean beetle but are damaged by the two-spotted mite.

In the above example, methyl O-(carbamyl)thiolacetohydroxamate, or S-methyl 1-dimethylcarbamoyl-N-[(methylcarbamoyl)oxy]thioformimidate may be substituted for methyl O-(methylcarbamoyl)thiolacetohydroxamate with essentially equivalent results.

Example 13

A wettable powder formulation is prepared from the following ingredients in the proportions given:

| | Percent |
|---|---|
| Methyl 1 - isobutylcarbamoyl)-2-benzimidazolecarbamate | 30.0 |
| Methoxychlor | 30.0 |
| Sodium lauryl sulfate | 1.0 |
| Oleic acid ester of sodium isethionate | 2.0 |
| Non-swelling montmorillonoid clay | 37.0 |

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermudagrass turf area in Florida. The area selected for the test is heavily infested with a plant-feeding mite, *Aceria neocynodomis*, and chinch bugs, *Blissus leucopterus insularis*. The chinch bugs are killed in the treated plot and the mite infestation soon disappears. The turf quickly returns to a healthy and attractive condition.

In a similar untreated plot both the mites and the chinch bugs continue to multiply and, by their feeding, the Bermudagrass becomes discolored and the turf reflects many unsightly dead spots. Similar plots sprayed with methoxychlor only are free of damage due to chinch bugs but are injured by the high mite infestation.

Example 14

| | |
|---|---|
| Methyl 1 - (butylcarbamoyl) - 2 - benzimidazolecarbamate | 30.0 |
| Thiram | 30.0 |
| Dioctyl sodium sulfosuccinate ("Aerosol" OTB) | 3.0 |
| Low viscosity methyl cellulose ("Methocel" 15) | 0.5 |
| Carbon black | 1.0 |
| Sucrose (commercial cane suger) | 35.5 |

The ingredients are blended and the mixture is first hammer-milled, then air-milled twice, until the active ingredient is present in particles substantially all of which are smaller than 5 microns.

The mixture of fungicides is diluted in a spray tank to a concentration of 1000 p.p.m. of combined active ingredients. It is sprayed to run off on apple trees in a portion of an orchard every two weeks during the growing season. At harvest, the treated trees are healthy and producing an abundance of normal fruit. The untreated trees, on the other hand, are partly defoliated by apple scrab (*Venturia inaequalis*), cedar apple rust (*Gymnosporangium juniperivirginianae*) and powdery mildew (*Podosphaera leucotricha*). The frust on the untreated trees is scabby, distorted with rust lesions and unmarketable due to the attack of these fungus pathogens. The degree of protection from this complex of serious diseases by the treatments with the above mixture is outstanding.

Example 15

A wettable powder is prepared by the method shown previously:

| | Percent |
|---|---|
| Methyl 1 - (butylcarbamoyl) - 2 - benzimidazolecarbamate | 60 |
| Alkylnaphthalene sulfonate, sodium salt ("Alkanol" B) | 5 |
| Polyvinylpyrrolidone derivative ("Ganex" 904) | 1 |
| Cane sugar | 34 |

A wettable powder is prepared by blending and hammer-milling the following ingredients:

| | Percent |
|---|---|
| Maneb | 60 |
| Alkylnaphthalene sulfonate, sodium salt ("Alkanol" B) | 5 |
| Polyvinylpyrrolidone derivative ("Ganex" 904) | 1 |
| Cane sugar | 34 |

Equal portions of these two powders are combined, blended, and hammer-milled to produce a powder containing 30% each of the two fungicides.

The wettable powder is suspended in water at a rate to obtain 1000 p.p.m. of the combined active ingredients. This mixture is sprayed to run-off on a single row of grape vines on a weekly schedule during the growing season. At harvest the treated vines and grapes are healthy and producing an abundance of normal fruit. The untreated plants in adjacent rows, on the other hand, are severely injured by downy mildew incited by *Plasmopara viticola*, powdery mildew incited by *Uncinula necator* and gray mold incited by *Botrytis cinerea*.

Example 16

| | Percent |
|---|---|
| Methyl 1 - (butylcarbamoyl) - 2 - benzimidazolecarbamate | 60 |
| Dioctyl sodium sulfosuccinate | 3 |
| Low viscosity methylcellulose | 0.5 |
| Sulfur (sublimed) | 36.5 |

The above composition was blended, hammer-milled and air milled in the same manner as the previous examples.

Test plots are established in a rice field. The plots are sprayed with water containing a suspension of the wettable powder described above along with a polyhydric alcohol ester surface active agent ("Trem" 014). The amount of the wettable powder used is such as to provide 1.5 grams of the active compound of this invention per liter of water. The amount of "Trem" 014 is 400 p.p.m. in the final spray. The spray is applied at weekly intervals at the rate of 900 liters per hectare. The remainder of the field is left unsprayed. Three months after the start of the test, the sprayed plots are healthy and growing well. The untreated plots on the other hand, are seriously damaged by the rice blast fungus, *Piricularia oryzae* which greatly reduces yield.

Example 17

A dust formulation is prepared from the following ingredients in the proportions listed:

| | Percent |
|---|---|
| Methyl 1 - (butylcarbamoyl) - 2 - benzimidazolecarbamate | 5 |
| Methoxychlor | 5 |
| Sodium alkylnaphthalenesulfate | 1 |
| Pyrophyllite clay | 89 |

The above ingredients are combined and rotated in a blender until uniformly mixed. The composition is then milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus telarius*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor but without methyl 1-(butylcarbamoyl)-2-benzimidazolecarbamate show no Japanese beetle injury. However, they are seriously damaged by mites and blockspot.

The following compounds can be substituted for methyl 1-(butylcarbamoyl)-2-benzimidazolecarbamate and which similarly formulated and used as above, give like results.

methyl 1-[(3,4-dichlorophenyl)carbamoyl]-2-benzimidazolecarbamate methyl 1-(ethoxycarbonylmethylcarbamoyl)-2-benzimidazolecarbamate methyl 1-(p-nitrophenylcarbamoyl)-2-benezimidazolecarbamate

I claim:
1. A compound of the formula:

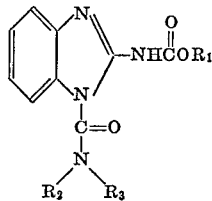

wherein $R_1$ is methyl, ethyl, isopropyl or sec-butyl;

$R_2$ is hydrogen, alkyl of 1 through 6 carbon atoms, alkenyl of 3 through 6 carbon atoms; alkynyl of 3 through 6 carbon atoms; and $R_3$ is alkyl of 1 through 12 carbon atoms; phenyl; phenyl substituted with methyl, ethyl, methoxy, ethoxy, nitro, cyano or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; cyclohexyl substituted with methyl; alkenyl of 3 through 10 carbon atoms; (alkoxycarbonyl)alkyl of 3 through 6 carbon atoms; or alkynyl of 3 through 6 carbon atoms.

2. A compound of the formula:

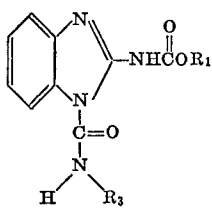

wherein $R_1$ is methyl, ethyl, isopropyl or sec-butyl; and $R_3$ is alkyl of 1 through 12 carbon atoms; phenyl; phenyl substituted with methyl, ethyl, methoxy, ethoxy, nitro, cyano or halogen; benzyl; benzyl substituted with methyl, nitro, methoxy, or halogen; (cycloalkyl)alkyl of 7 through 8 carbon atoms; (cycloalkyl)alkyl of 7 through 8 carbon atoms substituted with methyl; cyclohexyl; cyclohexyl substituted with methyl; alkenyl of 3 through 10 carbon atoms; (alkoxycarbonyl)alkyl of 3 through 6 carbon atoms; or alkynyl of 3 through 6 carbon atoms.

3. A compound of the formula:

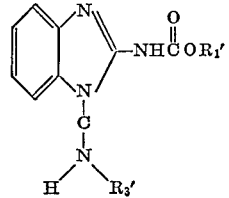

wherein $R_1'$ is methyl or ethyl and $R_3'$ is alkyl of 1 through 8 carbon atoms.

4. 1-butylcarbamoyl-2-benzimidazolecarbamic acid, methyl ester.

5. 1-hexylcarbamoyl-2-benzimidazolecarbamic acid, methyl ester.

References Cited

UNITED STATES PATENTS

| 2,933,502 | 4/1960 | Klopping | 260—309.2 |
| 2,933,504 | 4/1960 | Klopping | 260—309.2 |
| 3,010,968 | 11/1961 | Loux | 260—309.2 |

FOREIGN PATENTS

| 666,795 | 1/1966 | Belgium. |

OTHER REFERENCES

Ridi et al.: Chem. Abst., vol. 49, columns 4658–9 (1955).

NATALIE TROUSOF, Primary Examiner

U.S. Cl. X.R.

424—273

UNITED STATES PATENT OFFICE
CERTIFICATE OF CORRECTION

Patent No. 3,631,176  Dated December 28, 1971

Inventor(s) Hein L. Klopping

It is certified that error appears in the above-identified patent and that said Letters Patent are hereby corrected as shown below:

In Column 28, line 15 through 22, the formula should appear as follows:

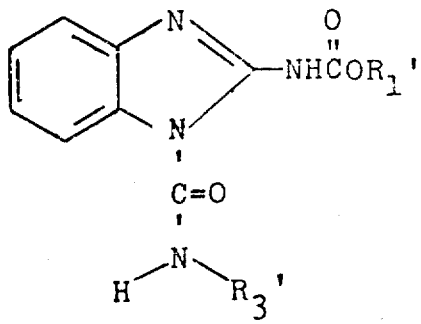

Signed and sealed this 6th day of June 1972.

(SEAL)
Attest:

EDWARD M. FLETCHER, JR.
Attesting Officer

ROBERT GOTTSCHALK
Commissioner of Patents